April 18, 1967 J. MURPHY 3,314,727
RIM AND WHEEL ASSEMBLY INCLUDING AN IMPROVED WEDGE
CLAMPING DEVICE THEREFOR
Filed Sept. 18, 1964 3 Sheets-Sheet 1
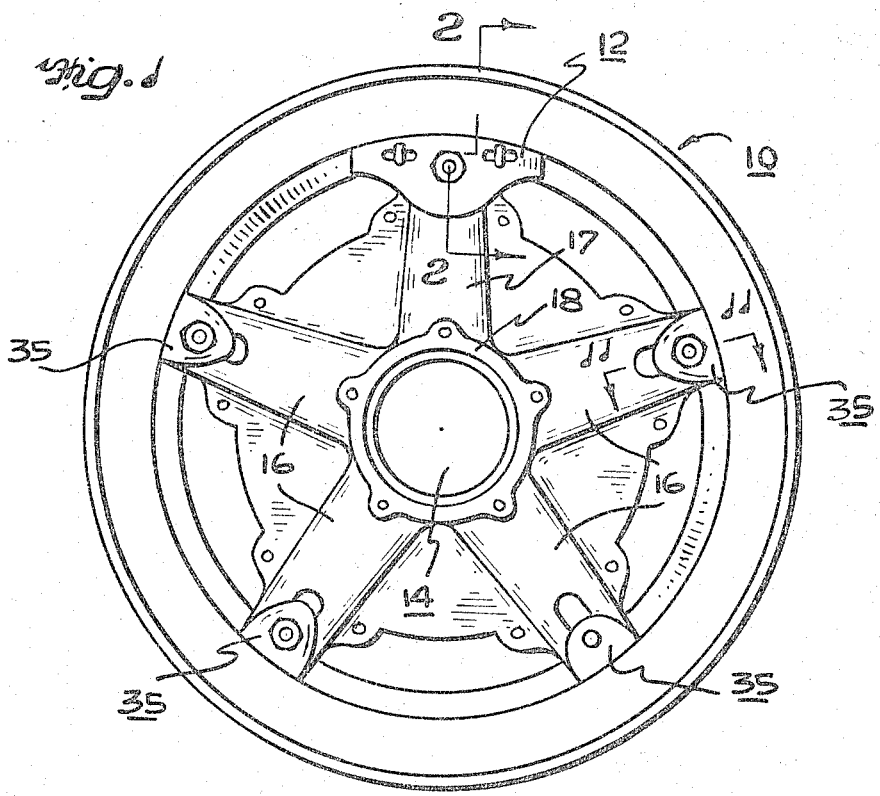
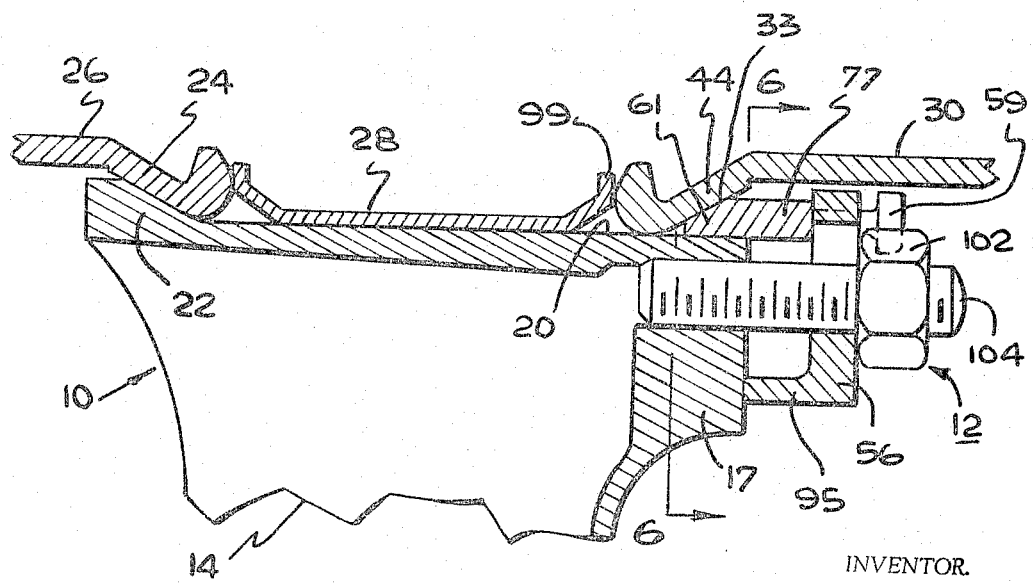
INVENTOR.
BY JAMES MURPHY
HIS ATTORNEY

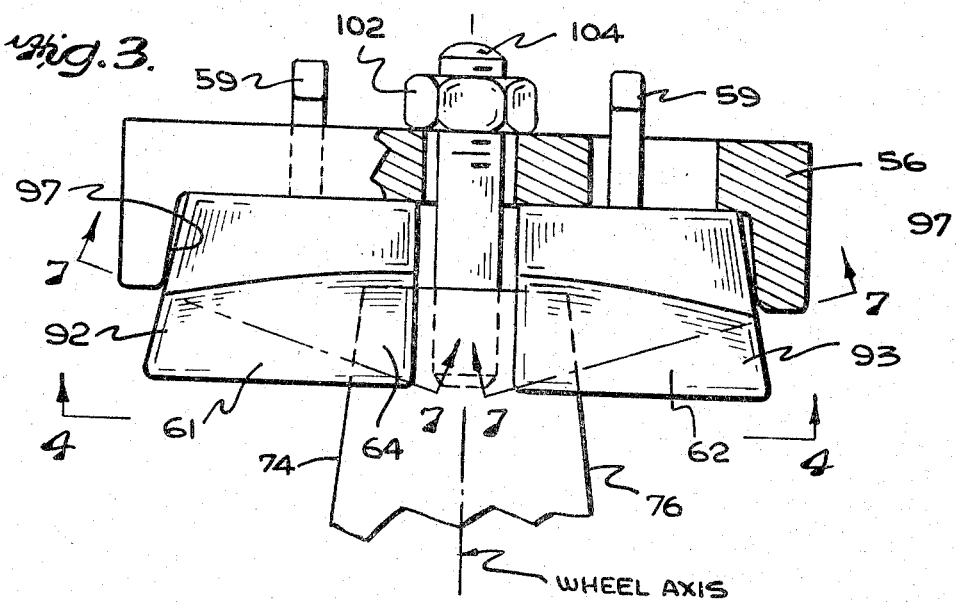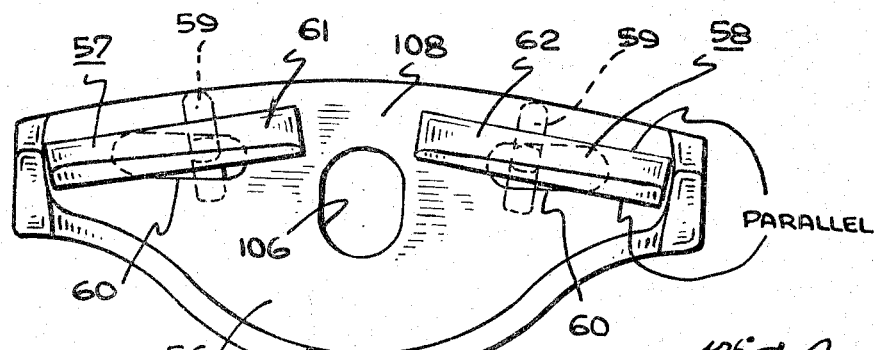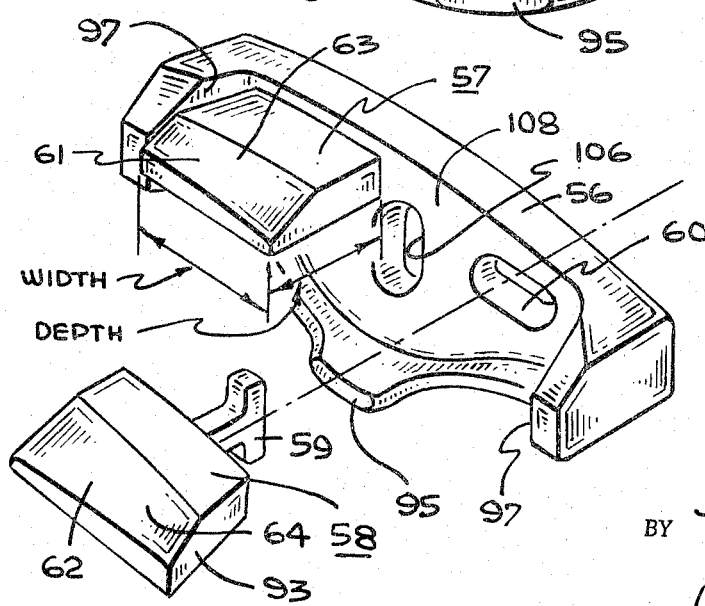

April 18, 1967  J. MURPHY  3,314,727
RIM AND WHEEL ASSEMBLY INCLUDING AN IMPROVED WEDGE
CLAMPING DEVICE THEREFOR
Filed Sept. 18, 1964                                     3 Sheets-Sheet 3
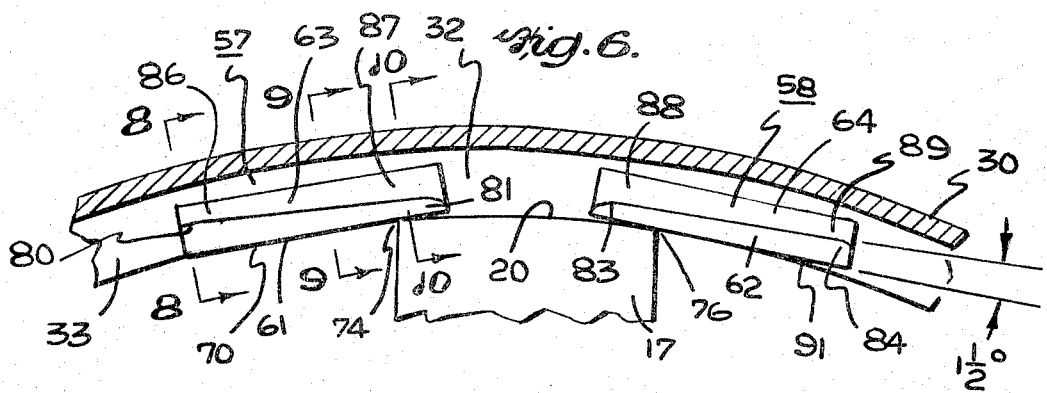
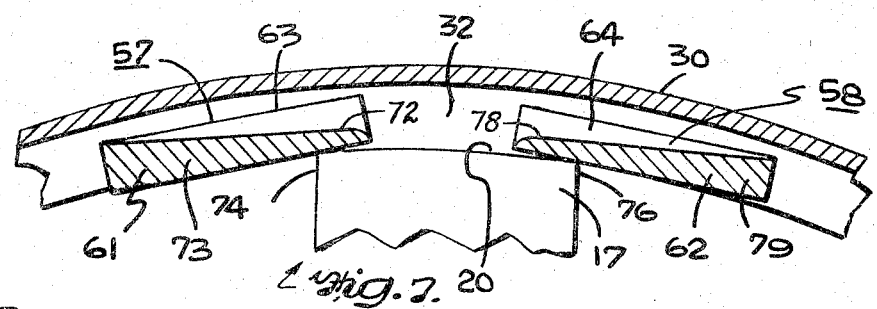
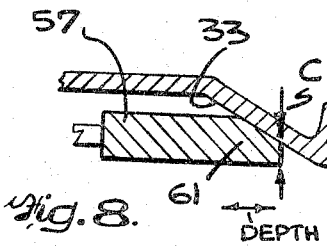
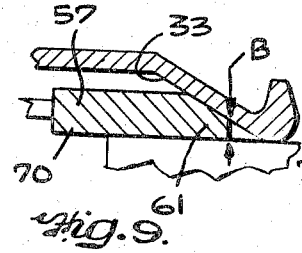
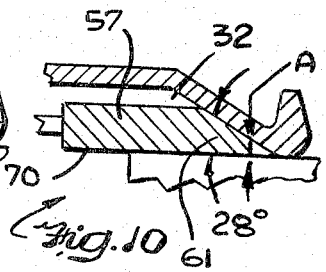
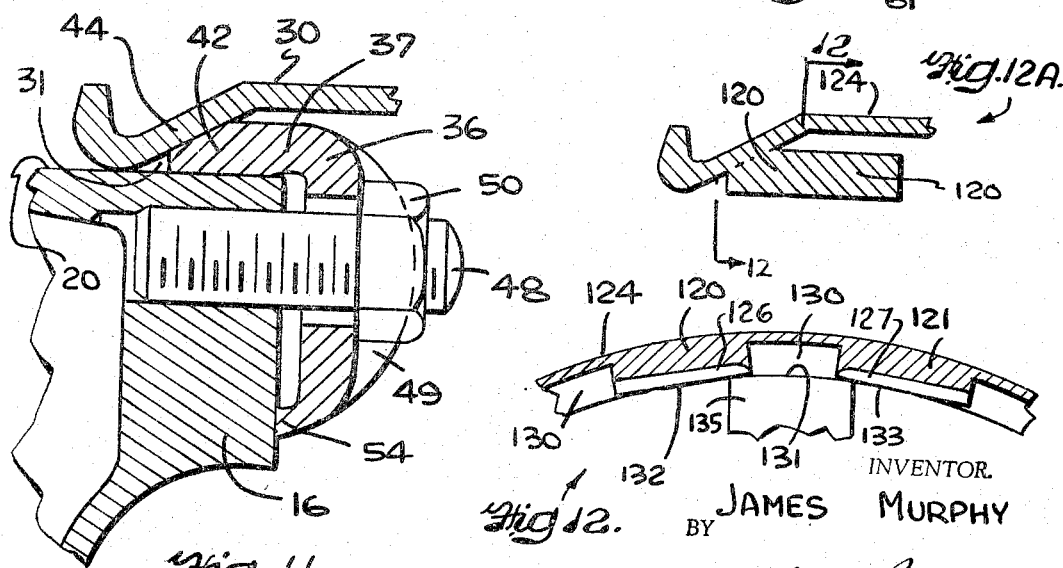
INVENTOR.
JAMES MURPHY
BY Peter Patane
HIS ATTORNEY

United States Patent Office 3,314,727
Patented Apr. 18, 1967

3,314,727
RIM AND WHEEL ASSEMBLY INCLUDING AN IMPROVED WEDGE CLAMPING DEVICE THEREFOR
James Murphy, Philadelphia, Pa., assignor to Murphy Enterprises, Inc., a corporation of Pennsylvania
Filed Sept. 18, 1964, Ser. No. 397,508
20 Claims. (Cl. 301—12)

My invention relates to the rim and wheel assemblies for trucks and trailers and, more particularly, provides an improved wedge clamping device for maintaining such rims securely mounted during operation of the truck or trailer.

My improved wedge clamping device may be incorporated in what are commonly called dual rim and wheel assemblies. In these assemblies, the wheel has a plurality of radially extending spokes which terminate in a felly surface. An inboard or inner rim is seated on the axially inner portion of the felly surface and, an outboard or outer rim is seated on the axially outer portion of the felly surface. Between the rims is placed an annular spacer band to provide working clearances for the tires that are mounted on the rims. The assembly of inner rim, spacer band and outer rim is secured to the wheel by my improved wedge clamping device.

The outer rim has a tapered annular flange which surrounds the felly surfaces of the spokes and they jointly define tapered, segmental annular spaces staggered about the rim into which are partially placed the wedges of my clamping device. The clamping device receives a stud carried by the spoke and a nut is threaded on the stud to draw the wedges tightly against the felly surface and the tapered annular flange of the outer rim.

The wedges heretofore used in the known fastening means, hereinafter referred to as clamping lugs, have not prevented the rims from creeping or continuing to move relative to the wheels when the trucks or trailers are suddenly decelerated. Such creepage eventually results in cutting of the air inlet tube of the tire or in forcing such tub into the tire casing without the knowledge of the driver. As this form of construction is frequently used in heavy trucks or trailers wherein two tires are mounted at each location, one tire can lose its air without the driver being aware of any difficulty until the second tire fails. The second tire will, of course, fail soon after the first tire fails.

I have found that by substituting for at least one of the known clamping lugs normally used in a rim and wheel assembly, a wedge clamping device constructed in accordance with my invention, that relative movement of the rim relative to the wheel is substantially prevented to the point where the tire is no longer damaged as heretofore.

My improved wedge clamping device, in one embodiment, comprises two circumferentially, spaced wedges carried by a retainer which is secured to one spoke of the wheel by a threaded stud carried by and extending axially therefrom and through the retainer to receive a threaded nut. Each wedge is formed with a compound taper such that the thickness of the wedge increases along the width of the taper as well as along its depth. Further, the height of the taper along the width of the wedge is such that only an entry or thinner portion of the wedge can fit between the felly surface and the tapered rim surface in the tapered, annular space previously mentioned. The remainder or thicker part of the wedge overhangs the side of the felly surface and when the truck or trailer suddenly stops, for instance, the thicker part of one wedge or of the other wedge (depending on the direction in which the truck or trailer is moving) tries to enter the smaller tapered, annular space but is prevented from doing so because of the jamming of the wedge at this time between the felly surface and the tapered rim flange surface.

The foregoing and other objects of the invention, the principles of the invention, and the best modes in which I have contemplated applying such principles will more fully appear from the following description and accompanying drawings in illustration thereof.

In the drawings,

FIG. 1 is a side elevation, taken from the outboard side, of a rim and wheel assembly incorporating my improved wedge clamping device;

FIG. 2 is a partial longitudinal sectional view taken along the line 2—2 in FIG. 1;

FIG. 3 is a top view of the improved wedge clamping device illustrated in FIGS. 1 and 2, partly broken away and sectioned to illustrate certain details, and resting on a felly surface of a partially illustrated spoke;

FIG. 4 is an elevation of the wedge clamping device illustrated in FIG. 3 and taken along the line 4—4 in FIG. 3 but omitting the spoke, stud and nut;

FIG. 5 is a perspective, partially exploded, view of my wedge clamping device;

FIG. 6 is a partial, sectional view illustrating the relationship between the wedges, the felly surface and the tapered surface of the rim;

FIG. 7 is a partial sectional view generally similar to FIG. 6 but taken through the wedges as indicated in FIG. 3 by the lines 7—7;

FIGS. 8, 9 and 10 are partial sectional views of the spoke, a wedge and the outer rim taken along the lines 8—8, 9—9 and 10—10, respectively, in FIG. 6.

FIG. 11 is a partial sectional view of a previously known wedge clamping lug and taken along the line 11—11 in FIG. 1; and FIGS. 12 and 12A are partial, sectional views illustrating a modification of my invention.

Referring to the drawings, FIGS. 1 and 2 illustrate a typical rim and wheel assembly 10 incorporating my improved wedge clamping device 12. The assembly 10 comprises a wheel 14 having a plurality of radially extending spokes which are similar to each other and all except one of them are designated by the reference numeral 16, the other being designated 17 for ease in later reference. Five spokes are illustrated in FIG. 1 but any desired number of spokes may be used, extending radially from a hub 18. Each of the spokes 16 and 17 terminate in a felly surface 20, i.e., a portion of a cylindrical surface, and a front or outer face (FIG. 1) and side surfaces (FIG. 6). Integral with the felly surface 20 of each spoke, at its inner end, is a tapered abutment or rim mounting surface 22 against which is seated the tapered inner rim flange 24.

After the inner rim 26 is mounted on the tapered inner rim flange 24, an annular spacer band 28 is seated on the medial portion of the felly surface 20 and abutted against the inner rim 26. Thereafter, an outer rim 30, is mounted on the axially outer portion of the felly surface 20 and in abutment with the spacer band 28.

Thus, five segmental, annular-like tapered spaces are defined between the spokes and the outer rim, the spaces associated with spokes 16 being designated 31 (see FIG. 11) and the space associated with spoke 17 being designated 32 (see FIG. 6) for convenience. Each of the spaces 31 or 32 is defined by the radially inner portion of a cylinder, i.e., the associated portion of the felly surface 20, and the radially outer part of each space being defined by a portion of a truncated cone, i.e., the associated portion of the radially inner surface 33 of the outer rim flange 44.

The assembly of the inner rim 26, spacer band 28, and outer rim 30 is secured to the wheel by four known clamping lugs or means 35, FIG. 1, associated with the four spokes 16, and the fifth spoke 17 has associated with it the wedge clamping device 12 constructed in accordance with my invention.

Each of the prior art, known clamping lugs 35, referring to FIGS. 1 and 11, comprise a U-shaped, in cross-section, lug 36 having an axial portion 37 which includes a wedge 42 with a radially outer surface conforming to the substantially 28° tapered shape of the outer rim annular flange 44. Also, the axial portion 37 of each lug 36 has an inner face which conforms to and rests on the felly surface 20.

Each of the spokes 16 carries a threaded stud 48 in a suitable threaded hole and the four studs 48 of the spokes 16 extend through suitable openings in the radial portions 49 of the lugs 36.

When the nuts 50, threaded on the studs 48, are tightened, the wedges 42 are driven into the segmental, tapered spaces 31 between the felly surfaces 20 and the tapered flange 44 to secure the inner rim 26, spacer band 28, and outer rim 30 between the tapered felly surface 22 and the wedges 42. Preferably, the foot 54 of each lug should contact the axially outer face of each of the spokes 16 prior to fully tightening the nuts, to assure that the rim 30 is aligned perpendicular to the rotational axis of the wheel.

The wedge clamping device 12 incorporating my invention comprises a retainer 56 to which are loosely secured wedge elements 57 and 58 by T-shaped keys 59 extending through horizontally elongated slots 60.

The wedge elements are formed from parallel faced rectangular blocks and have forward wedges 61 and 62. The wedges 61 and 62 are defined by (radially outer) surfaces 63 and 64 having a compound taper.

By compound taper I means that the surface 63 of the wedge 61 tapers in two directions. That is, the surface 63 tapers up and to the left, as viewed in FIG. 5, when looking at the width of the wedge, i.e., transversely to the axis about which the wheel rotates, and also tapers up and to the right, when looking at the depth of the wedge, i.e., along the axis about which the wheel rotates. The taper depthwise is substantially 28°, the taper of the inner surface 33 of the flange 44, and the taper along its width is approximately 1½°, see also FIGS. 6 and 10 where these degrees are indicated with reference to the straight under surface 70 of the wedge element 57.

Referring to FIG. 7, this compound taper results in the wedge 61, for instance, having a leading thinner part 72 to the right of the spoke shoulder 74, i.e., equal to or less than the radial dimensions of space 32 into which it fits and a thicker part 73, i.e., radially greater in size than the space 32, to the left of the shoulder 74.

The wedge 62 is tapered in a manner similar to the wedge 61, except that the leading thinner part 78 is to the left of the shoulder 76 and the thicker part 79 to the right thereof.

Thus, the thin parts 72 and 78 of the two wedges are received within the space 32 but are separated from each other, as shown, and the thick parts 73 and 79 overhang, i.e., project beyond the spoke 17 circumferentially on opposite sides thereof. It is to be noted that the rear 77 of the wedge elements is a maximum thickness and extends beyond the face of the spoke 17, FIG. 2.

The radial dimension of the segmental space 32 is that illustrated in FIGS. 6 and 10. It is seen that the parts of the wedges 61 and 62 which overhang the spoke 17, i.e., the parts to the left and to the right of the space 32 in FIG. 6, have a thickness which increase across the width of the wedges. As seen in FIG. 9, the wedge thickness dimension B is greater than the wedge thickness dimension A in FIG. 10, and the wedge thickness dimension C in FIG. 8 is greater than the wedge thickness dimension B in FIG. 9.

Thus, when the vehicle stops suddenly and the outer rim 30 wants to continue to rotate relative to the spoke 17, or wants to creep as has been the case heretofore, one or the other of the two wedges, depending on the direction of rotation, will try to enter further into the space 32. However, since the part that is trying to enter further is of larger thickness, all that results is that the wedge is jammed even more tightly, preventing relative movement between the rim 30 and the spoke 17.

To facilitate insertion of the wedges I prefer to chamfer the opposite end portions. In the drawing, the chamfered ends of wedge 61 are indicated at 80 and 81 and the chamfered ends of wedge 62 are indicated at 83 and 84.

Referring to FIG. 6, it is seen that each wedge element 57 or 58 engages the felly surface 20 and the surface 33 at essentially three limited zones or areas to provide essentially line contact. Referring to the wedge element 57, for example, engagement takes place between the under surface 70 at the left shoulder 74 of the spoke 17 and at spaced zones 86 and 87 inward of the chamfered parts 80 and 81. A similar three zone engagement takes place at shoulder 76 and zones 88 and 89 of wedge element 58. This is due to the fact that the straight undersurfaces 70 and 91 of the two wedges are, of course, non-conforming with the cylindrical shape of the felly surface 20, as also are non-conforming the truncated cone surface 33 and the compound tapered upper surfaces 63 and 64 of the wedges, together with the fact that the overhanging parts of the wedges are thicker than the radial dimension of the space 32.

The wedges 61 and 62 are proportioned relative to the space 32 so that to be inserted into the space 32 the two wedge elements must be spaced apart from each other, as illustrated, at which time the slanted side surfaces 92 and 93, converging outwardly of the wheel (as illustrated in FIG. 3), abut the (similarly converging) shoulders 96 and 97 of the retainer end portions.

As the nut 102 is tightened on the stud 104 carried by the spoke 17 in a suitable threaded hole and extending through a vertically elongated hole 106 in the body 108 of the retainer 56, the shoulders 96 and 97 abut the side surfaces 92 and 93 and urge the wedges 61 and 62 toward each other while at the same time the rear surfaces of the wedges are in contact with the body 108 of the retainer and are urged thereby axially (of the wheel) into the space 32.

The fit between the keys 59 and the slots 60 is purposely made a loose one so that some limited movement can take place as the nut 102 is tightened, whereby the wedges are permitted to seat themselves between the rim 30 and the spoke 17 in the most effective manner.

To assemble or disassemble the wedge elements 57 and 58 to or from the retainer 56, the elements are rotated about 90° from the positions shown in FIG. 5 and either moved toward or away from the retainer.

The retainer has a foot 95 which engages the face of the spoke 17, FIG. 2, before the nut 102 is fully tightened to insure that the rim 30 is mounted perpendicular to the axis of the wheel. A suitable working clearance is provided between the top of the retainer 56 and the rim 30, as also illustrated in FIG. 2.

The stud 104 and the nut 102 for the spoke 17 are similar to the studs 48 and the nuts 50 previously described in connection with spokes 16, and are numbered differently merely to distinguish them from the other.

As is apparent, if desired, all of the clamping lugs 35 could be replaced by wedge clamping devices 12 constructed in accordance with my invention but I have found this to be unnecessary as one wedge clamping device 12 suffices.

Also, if prevention of rim creepage when the wheel is rotating in one direction only is desired, only one of the wedges constructed in accordance with my invention need be provided.

While the under surface 70 and 71 of the wedge elements 57 and 58 have been illustrated and described as straight, and are so preferred, they could be made curved to mate with the felly surface without departing from my invention.

My wedge clamping device 12 has been illustrated and described in connection with the outer rim 30 because the creepage problem is associated with the outer rim 30 as the inner rim 12 and tapered flange 24 are usually provided with means (not illustrated) for preventing creepage, such as radial projections or stops integral with the tapered flange 22 and cooperating with the inner rim flange 24 to prevent the creepage thereof.

Although my invention has been described and illustrated in combination with a two rim assembly it is seen that if only the outer rim were to be used and the felly surface provided with an integral annular or segmental abutment in place of the spacer flange 99, that this invention could be used equally with such a one rim construction.

Of course, depending on the diameter of the rims and on the size of the spokes, the width, depth and height of the wedge element, and the size of the retainer, may require changing from those sizes illustrated in the drawings.

If desired, the wedge elements 57 and 58 could be made integral with the retainer 56 in which event the keys 59 and slots 60 are omitted but in this case the wedge elements are not readily adaptable to spokes of slightly different width.

I have constructed the wedge elements 57 and 58 and the retainer 59 from aluminum but steel or other suitable materials may also be used.

From the foregoing it is seen that I have provided a wedge tapered in two transverse directions the thin portion of which is inserted between the rim and the spoke and the thick portion circumferentially overhangs the spoke and is thicker than the space between the rim and the spoke so that upon sudden stopping of the vehicle, creeping of the rim relative to the spoke is prevented.

In FIGS. 12 and 12A I have illustrated a modification of my invention in which the wedges of the previous embodiment are replaced by wedge-like portions 120 and 121 which are made integral with the rim 124. As will be understood, this also results in tapered thinner portions 126 and 127 being received, circumferentially spaced from each other as illustrated, in the segmental, annular space 130 between the felly surface 131 and the rim 124, and in thicker portions 132 and 133 which are outside the space 130 and circumferentially overhang the spoke 135 on opposite sides thereof, as illustrated. A suitable retainer (not illustrated) is provided which in conjunction with a suitable bolt and nut (not illustrated), but all similar to those corresponding parts disclosed in connection with the previous embodiment, except that the key and slot connection is omitted, are used to seat the rim 124 against the abutment or spacer flange (not illustrated) carried by the wheel.

Having described my invention, I claim:

1. In combination, a wheel having a plurality of radially extending spokes defining felly surfaces, a removable rim mounted on said felly surfaces and having a tapered flange, a wedge clamping device associated with at least one of said spokes, said wedge clamping device comprising a retainer and a wedge element, said wedge element being tapered along the axis about which the wheel is rotatable and also tapered transversely thereto to define a compoundly tapered wedge portion comprising a thin wedge portion and a thicker wedge portion, said thin wedge portion being circumferentially partially interposed between the tapered flange of said outer rim and the associated felly surface portion with the thicker wedge portion circumferentially overhanging the spoke, and a means connected to said spoke for connecting said retainer to said spoke and biasing said retainer against said wedge element.

2. The combination recited in claim 1 wherein said means comprises a stud secured to said spoke and extending through said retainer, and a nut threaded on said stud for securing said retainer to said spoke and biasing said retainer against said wedge element.

3. The combination recited in claim 1 and further including second means associated with the other spokes of said wheel to also secure said rim to said wheel.

4. The structure recited in claim 1 and wherein each wedge clamping device includes two wedge elements arranged circumferentially, the thin wedge portions opposing each other and the thicker wedge portions overhanging the spoke on opposite circumferential sides thereof.

5. The structure recited in claim 4 and further including the wedge elements having key portions extending through openings in said retainer for loosely securing the wedge elements to said retainer, the wedge elements having slanted surfaces converging outwardly of said wheel, said retainer having a body and end portions defining shoulders for engaging said slanted surfaces and biasing the wedge elements toward each other as the body of said retainer urges the rear of the wedge elements toward the rim.

6. The structure recited in claim 5 and further including a means connected to said spoke and extending through said retainer for securing said retainer to said spoke and biasing said retainer against said wedge elements, and a second means associated with the other spokes of said wheel to secure said rim to said wheel.

7. The combination recited in claim 1 wherein said wedge portion is defined on one side by a surface tapered along the width of the wedge element as well as along its depth and defined on the opposite side by a planar surface, said retainer and wedge element including a second means for loosely connecting said wedge element to said retainer.

8. In combination, a wheel having a plurality of radially extending spokes defining felly surfaces, an abutment secured to said wheel, a removable rim mounted on said felly surfaces, said rim having a tapered flange, a wedge clamping device for biasing said rim toward said abutment and restraining movement of said rim relative to said wheel, said wedge clamping device being associated with at least one of said spokes, said wedge clamping device comprising a retainer and two wedge elements, each wedge element including thinner and thicker wedge portions defined on one side by a surface tapered along its width as well as along its depth and defined on the opposite side by a planar surface, each wedge element having a rear portion defining the thickest portion of the wedge element, the thinner wedge portion being interposed between the tapered flange of said rim and the associated felly surface portion and the thicker wedge portion overhanging the spoke on opposite circumferential sides, means connected to said spoke to secure said wedge clamping device to said spoke, and keys formed on said wedge elements and extending through openings in said retainer to losely secure said wedge elements to said retainer, and second means associated with the other spokes of said wheel to secure said outer rim to said wheel.

9. The structure recited in claim 8 and wherein said wedge elements have slanted surfaces converging outwardly of said wheel, said retainer has a body and shoulder portions engaging said slanted surfaces and biasing said wedge elements toward each other as the body of said retainer urges the rear of the wedge elements toward the rim.

10. The structure recited in claim 8 wherein opposite edge portions of the thinner and thicker wedge portions are chamfered, said wedge elements having slanted surfaces overhanging said wheel, and said retainer having a body and shoulder portions engaging said slanted surfaces to bias said wedge elements toward each other as the body of said retainer urges the wedge elements toward the rim.

11. An annular rim having a tapered mounting flange adapted to be mounted on felly surfaces of a wheel and adapted to define therewith annularly arranged spaces, said rim having at least one integral wedge-like projection on said tapered flange engageable with a felly surface, said wedge-like projection including circumferentially tapered thinner and thicker portions, whereby the thinner portion is adapted to be received in said segmental space and said thicker portion is adapted to circumferentially overhang a spoke.

12. The structure recited in claim 11 wherein said rim has two wedge-like projections integral therewith but spaced circumferentially from each other and adapted to be placed so that the thicker portions overhang circumferentially opposite sides of a spoke.

13. A wedge clamping device for use with a spoke of a wheel having a plurality of radially extending spokes defining felly surfaces, said wedge clamping device comprising a retainer and two wedge elements each wedge element having a surface tapered inwardly from the retainer and also tapered transversely thereto to define thinner and thicker wedge portions the thinner portions of said wedge elements being adapted to be circumferentially inserted between the felly surface of one spoke and the tapered flange of an associated rim, said wedges being spaced from each other, whereby said wedge clamping device is adapted to be added to the spoke by inserting said thinner parts of said wedge element between the felly surface and the rim flange with the thicker parts of the wedges overhanging the spokes.

14. A wedge clamping device for use with a wheel having a plurality of radially extending spokes defining felly surfaces, said wedge clamping device comprising a retainer and two separable wedge elements, each wedge element having a surface tapered along its width as well as along its depth to define thinner and thicker wedge portions, the thinner portions of said wedge elements being adapted to be interposed between the tapered flange of a rim and the associated felly surface portion and the thicker portions of said wedges being adapted to overhang the spoke on opposite sides, and said retainer having a hole through which a stud extends.

15. The structure recited in claim 14 and further including said wedge elements including keys extending through openings in said retainer for loosely securing said wedge elements to said retainer.

16. The structure recited in claim 14 and further including said wedge elements having slanted surfaces converging outwardly of said wheel, the retainers having a body and shoulder portions engaging said slanted surfaces and biasing said wedge elements toward each other as the body of said retainer urges said wedge elements toward the rim.

17. A wedge clamping device for use with a wheel having a plurality of radially extending spokes defining felly surfaces, said wedge clamping device comprising a retainer and a wedge element, said wedge element having a surface tapered along its width as well as along its depth to define thinner and thicker wedge portions, the thinner wedge portions being adapted to be interposed between the tapered flange of the rim and the associated felly surface portion and the thicker wedge portion being adapted to circumferentially overhang the spoke, and means for securing said retainer to the spoke and biasing said retainer toward the rim.

18. A wedge clamping device for use with a spoke of a wheel having a plurality of radially extending spokes defining felly surfaces and a removable rim having a tapered flange and mountable on said spokes, said wedge clamping device comprising a retainer and two wedge elements, each wedge element having a leading, thinner portion and a thicker wedge portion, and the leading portions of said wedge elements being adapted to fit between a felly surface and a tapered flange of a rim, said wedge elements having extending through openings in said retainer to loosely secure said wedge elements in spaced relation to each other.

19. In combination, a wheel having a plurality of radially extending spokes defining felly surfaces and a removable rim having an annular flange mounted on said spokes, and a clamping device comprising a retainer and a wedge, said retainer and said wedge being joined together to define planes approximately forming a right angle, said wedge comprising tapered thinner and thicker portions, said thinner portion and said thicker portion uniformly tapering in a direction which is generally parallel to the plane within which lies the leg of the right angle defined by said retainer, and said thinner portion fitting between said felly surface and said flange while said thicker wedge portion overhangs said spoke, and means for securing said retainer to said spoke.

20. In combination, a wheel having a plurality of radially extending spokes defining arcuate felly surfaces and a removable rim having an annular tapered flange mounted on said spokes, each spoke having an outer face and side surfaces, and a wedge partially interposed between said flange and one of said spokes, said wedge having an outer surface relative to the center of the wheel which is tapered in two transverse directions to form uniformly tapering thinner and thicker portions, and said thicker portion overhanging said spoke on one side.

References Cited by the Examiner
UNITED STATES PATENTS

| | | | |
|---|---|---|---|
| 1,233,465 | 7/1917 | Harris | 301—24 X |
| 1,860,001 | 5/1932 | Vanderveer | 301—22 X |
| 2,911,255 | 11/1959 | Bellairs | 301—20 X |
| 3,199,920 | 8/1965 | Hurst | 301—13 |

BENJAMIN HERSH, *Primary Examiner*

R. J. JOHNSON, *Assistant Examiner.*